A. P. BRUSH.
VEHICLE DRIVE MECHANISM.
APPLICATION FILED JUNE 1, 1914.
1,130,793.
Patented Mar. 9, 1915.
4 SHEETS—SHEET 2.
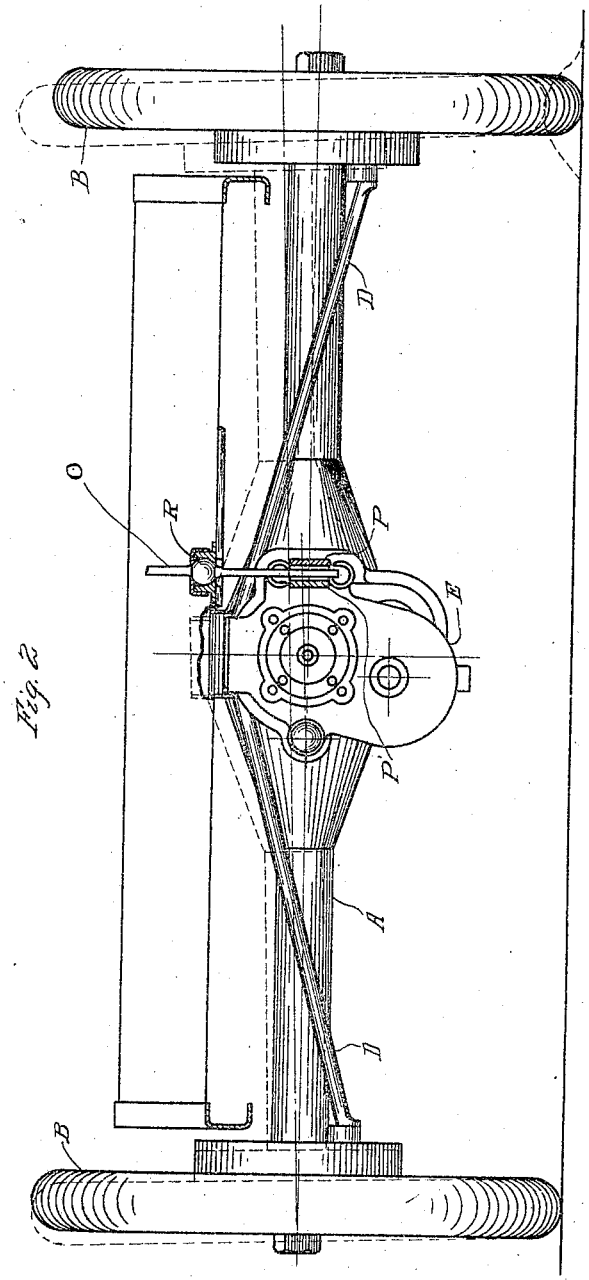
WITNESSES:
Jan J. Lewis
James P. Barry
INVENTOR
ALANSON P. BRUSH
BY
Whittemore Hulbert & Whittemore
ATTORNEY

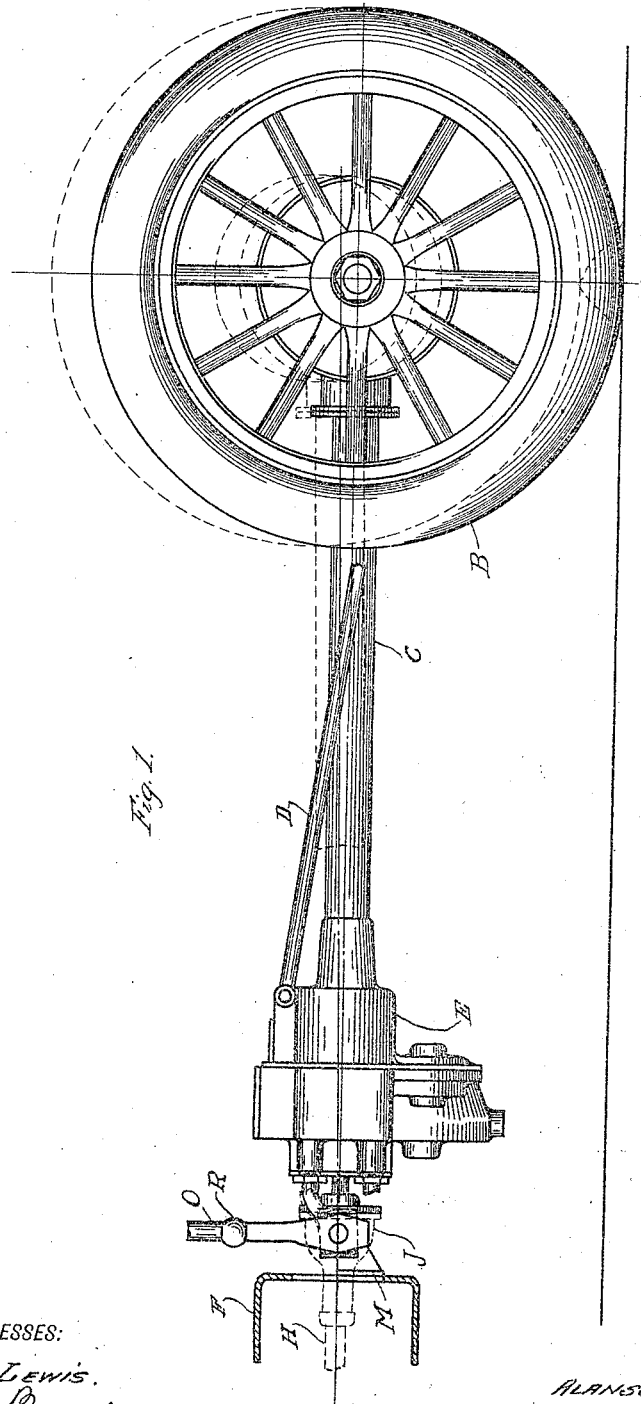

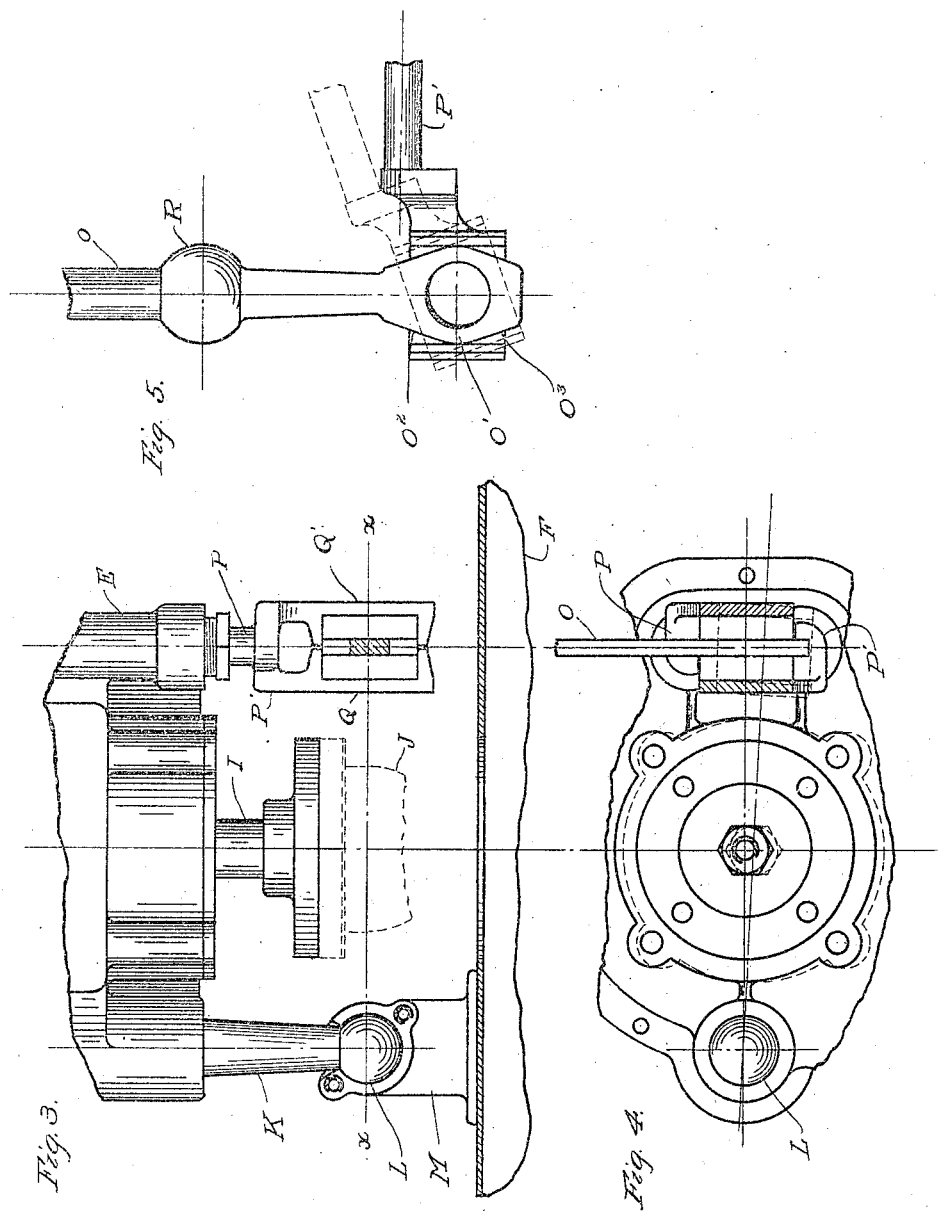

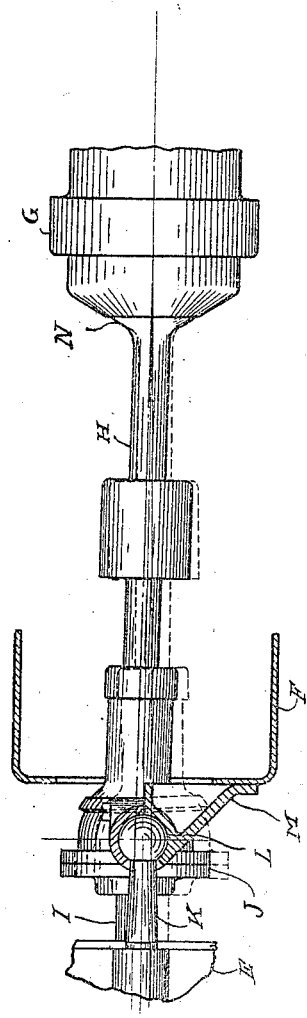

UNITED STATES PATENT OFFICE.

ALANSON P. BRUSH, OF DETROIT, MICHIGAN.

VEHICLE DRIVE MECHANISM.

1,130,793.  Specification of Letters Patent.  Patented Mar. 9, 1915.

Application filed June 1, 1914. Serial No. 842,119.

*To all whom it may concern:*

Be it known that I, ALANSON P. BRUSH, a citizen of the United States of America, residing at Detroit, in the county of Wayne and State of Michigan, have invented certain new and useful Improvements in Vehicle Drive Mechanisms, of which the following is a specification, reference being had therein to the accompanying drawings.

The invention relates to motor vehicles, and has particular reference to the means employed for transmitting the power from the motor to the drive axle and the thrust of said axle to the vehicle frame.

In the drawings:—Figure 1 is a side elevation partly in section of a portion of the motor vehicle with my improved drive mechanism applied thereto; Fig. 2 is a cross section; Fig. 3 is a plan view showing the thrust connection between the propeller shaft housing and the frame, and also the control mechanism for the transmission; Fig. 4 is a section on line $x$—$x$ Fig. 3; Fig. 5 is a side elevation of the control lever and its connection to the transmission; and Fig. 6 is a side elevation partly in section, showing the intermediate connection between the motor and the propeller shaft.

A is the rear axle; B the drive wheels; C the forwardly-projecting tubular housing for the propeller shaft; D are brace rods therefor; and E is a housing for the transmission gearing preferably arranged at the forward end of the tubular housing C.

F is a cross-bar of the vehicle frame, which, as shown is in the form of a channel beam.

G is the main clutch, and H is the shaft for connecting said clutch with the propeller shaft within the tubular housing C.

To provide for the relative oscillation of the frame, there must be a universal coupling between the drive shaft and the propeller shaft and also a universal coupling between the propeller shaft housing and the frame, through which the driving thrust is transmitted. With certain constructions heretofore employed these two universal couplings have been arranged concentrically, but this necessitates an increase in the size of the outer universal in excess of the requirement for strength, to provide space for the reception of the inner universal. With my improved construction I have simplified and decreased the size of the parts by substituting a laterally offset relation of the two universals for the concentric relation. As shown, I is the propeller shaft, J is a universal coupling between said shaft and the shaft H, and K is a projecting arm from the housing E, which has a universal pivotal connection L with a bracket M on the cross bar F of the frame. The centers of the couplings J and L are arranged in a line parallel to the axle, and consequently the usual vertical oscillations of the axle and the frame may occur without any relative displacement of said couplings. When, however, there is a twisting of the frame or the raising of one wheel higher than the other, due to inequalities in the road bed, there will be a displacement of the propeller shaft, due to the offset relation of the coupling L. This I have provided for by placing a second universal coupling N between the transmission shaft H and the clutch G, which permits the universal J to rise or fall, moving in an arc about the center of the universal L.

The transmission gearing is housed within the casing E and is controlled by a lever O mounted upon the frame. As the frame and housing E are relatively movable, I have provided a connection between the lever O and the shifter rods of the gearing, which will be unaffected by either vertical or angular movement. As shown, the shifters P and P' project outward from the forward end of the housing E and have their forward end portions arranged in the same horizontal plane adjacent to each other. These forward portions Q and Q' are notched for the reception of an enlargement O' at the lower end of the lever O, with sufficient clearance to permit the maximum angular movement to which the parts are subjected. The enlargement O' has tapering portions $O^2$ and $O^3$ on opposite sides thereof, and thus a limited angular movement in all directions is permitted. Also a vertical relative movement of the lever and the rods P and P' will not affect the connection. The lever O is preferably fulcrumed with a universal pivot, as indicated at R, to permit of lateral angular movement or adjustment from the notch in one of the shifters to that in the adjacent shifter, and longitudinal movement for adjusting the shifters.

The cross bar F of the frame is preferably arranged so that the shaft H will pass through the neutral axis of the beam, which latter is apertured to provide sufficient clearance.

This also brings the plane of the thrust from the coupling L substantially in the neutral axis, which avoids any twisting stress upon the frame.

What I claim as my invention is:—

1. The combination with a vehicle frame and a drive axle, of a power transmission shaft extending from said frame to said drive axle, a housing for said shaft through which the thrust is transmitted to said frame, and universal couplings respectively for said power transmission shaft and between said housing and frame having their centers arranged in a line parallel to said drive axle; laterally offset in relation to each other.

2. The combination with a frame and a drive axle, of a power transmission shaft extending from said frame to the axle, a forward extension from the axle for transmitting thrust to the frame, a universal coupling between said forward extension and the frame, laterally offset in relation to the axis of said power transmission shaft, a universal coupling in said power transmission shaft in transverse alinement with said universal coupling to the frame, and a second universal coupling in said power transmission shaft, permitting the vertical displacement thereof in a path concentric to said universal coupling to the frame.

3. The combination with a frame and a drive axle, of a power transmission shaft extending from said frame to said axle, a forward extension from said axle for transmitting thrust to the frame, a universal coupling between said forward extension and the frame, laterally offset in relation to the axis of said power transmission shaft, a universal coupling in said power transmission shaft having its center in a line passing through the center of the universal coupling to the frame and parallel to the axle, a drive member journaled in fixed bearings on the frame, and an angularly displaceable shaft between said drive member and universal coupling in said power transmission shaft, permitting displacement of the latter in a path concentric to the universal coupling of said forward connection with the frame.

4. The combination with a frame and a drive axle, of a power transmission shaft extending from the one to the other, a forward extension from said axle for transmitting the thrust to the frame and in which said power transmission shaft is journaled, a universal coupling between said forward extension and the frame, laterally offset in relation to the axis of said power transmission shaft, a rotary drive member journaled in fixed bearings upon the frame, a universal coupling for said power transmission shaft in transverse alinement with the universal coupling to said frame, and an angularly displaceable shaft between said universal coupling in the power transmission shaft and said rotary drive member on the frame.

5. The combination with the frame and a drive axle, of a power transmission shaft extending from one to the other, a forward extension from the axle forming a housing and journal for said power transmission shaft and also the means for transmitting the thrust from the axle to the frame, a transmission gearing mounted on the forward portion of said forward extension, a universal coupling between said forward extension and the frame, laterally offset in relation to the axis of said power transmission shaft, a connection between said power transmission shaft and the drive mechanism on said shaft in a path concentric to said universal coupling, and a control for said transmission gearing mounted on said frame and laterally offset in relation to said universal coupling, said control permitting the universal movement of said transmission and being operable in all positions of adjustment thereof.

6. The combination with the frame and a drive axle, of a power transmission shaft extending from the one to the other, a forward extension of said axle forming a housing for said power transmission shaft and having a housing for the transmission gearing at its forward end, a transmission gearing in said housing, an arm projecting from said transmission housing, laterally offset with respect to the axis of said power transmission shaft and having a universal coupling with said frame, gear shifters projecting from said housing from the opposite side of said power transmission shaft, a control lever universally pivotally mounted on said frame, and means of engagement between said control lever and said gear shifters alternatively, permitting of the universal movement of said housing concentric with said universal coupling and being operable in all positions of adjustment.

7. The combination with a frame and a drive axle, of a power transmission shaft extending from the one to the other, a cross member on said frame apertured in its neutral axis for the passage of said power transmission shaft, a forward extension from said axle forming a housing for said power transmission shaft and transmitting the thrust to said frame, a universal coupling between said forward extension and cross member of the frame, located centrally of the latter, and a member substantially parallel to said power transmission shaft extending between said universal coupling and extension.

8. The combination with a frame and a drive axle, of a forward extension from said axle having a universal coupling with said frame, a power transmission connection from said frame to the axle, including a shaft journaled in the forward end of said forward extension and having a universal coupling in transverse alinement with but laterally offset from the universal coupling to said frame, a rotary drive member on said frame, and a shaft connecting said rotary drive member with said universal shaft coupling, displaceable longitudinally and angularly to permit universal movement concentric with the axis of said universal coupling to the frame.

In testimony whereof I affix my signature in presence of two witnesses.

ALANSON P. BRUSH.

Witnesses:
  JAMES P. BARRY,
  ARTHUR D. PULVER.